May 2, 1961  M. GREEN  2,982,906
MAGNETORESISTIVE BRIDGE CIRCUIT
Filed April 4, 1957
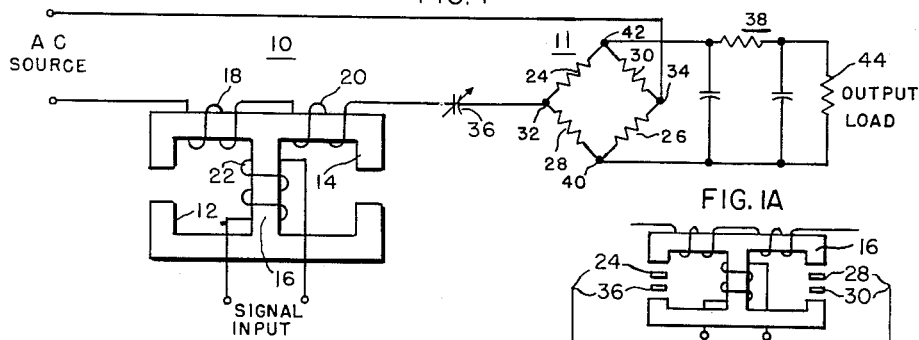
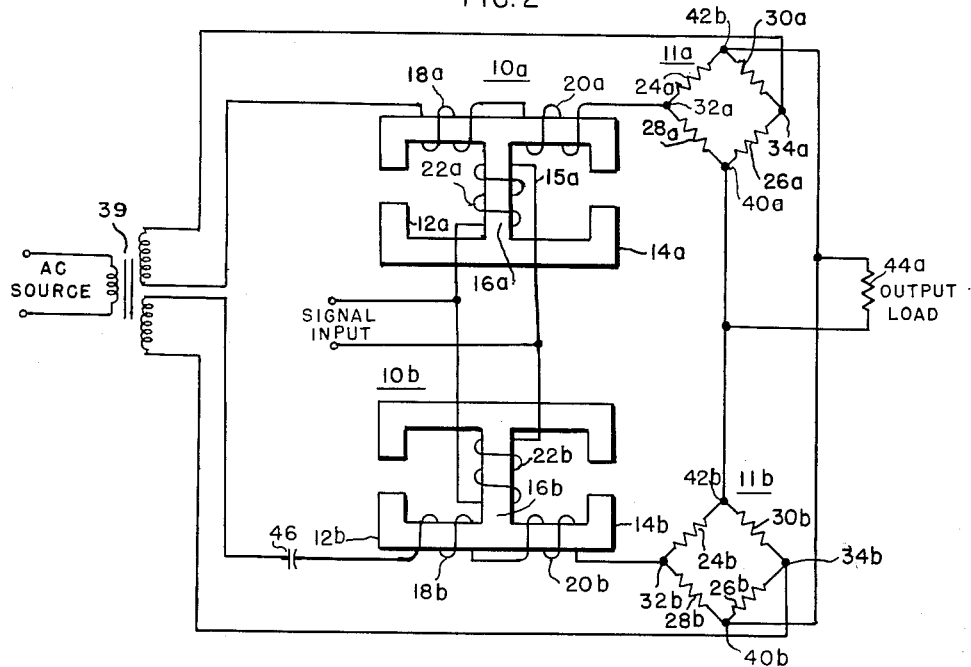
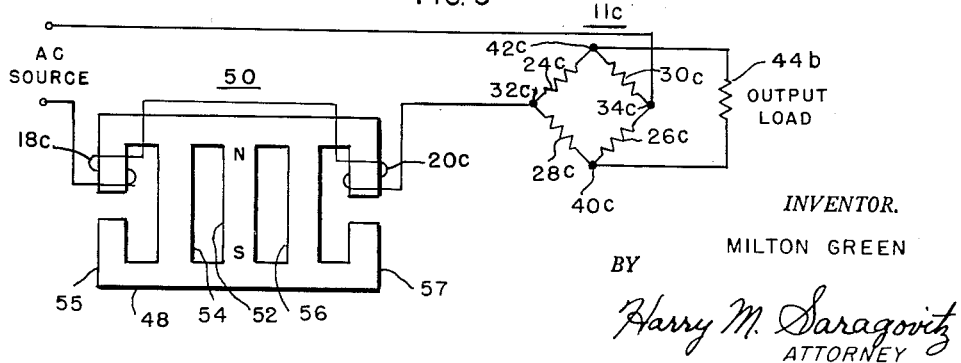
INVENTOR.
MILTON GREEN
BY
Harry M. Saragovitz
ATTORNEY United States Patent Office 2,982,906
Patented May 2, 1961

2,982,906
MAGNETORESISTIVE BRIDGE CIRCUIT

Milton Green, Little Silver, N.J., assignor to the United States of America as represented by the Secretary of the Army Filed Apr. 4, 1957, Ser. No. 650,802

7 Claims. (Cl. 321—47)

(Granted under Title 35, U.S. Code (1952), sec. 266)

The invention described herein may be manufactured and used by or for the Government for governmental purposes, without the payment of any royalty thereon.

This invention relates to electrical translating circuitry of the type employing magnetically responsive resistors, i.e., resistors which change their resistance value in the presence of a changing magnetic field, and particularly to circuitry for the amplification or rectification of alternating current.

It is well known that certain materials, e.g., bismuth, certain iron-nickel alloys, and certain semiconductors, particularly those with high charge carrier mobility such as indium antimonide and indium arsenide, change in electrical resistance when subjected to changing magnetic fields. This effect is utilized to accomplish a number of novel electrical translating functions.

It is an object of the present invention to provide an improved magnetoresistive circuit suitable for amplification or rectification.

It is a further object of the invention to provide an amplifier capable of alternating or direct current amplification which is powered by an alternating current source.

In accordance with the invention a magnetoresistive circuit is constructed with two magnetic core loops sharing a common magnetic core region. The loops are equally magnetically energized by electromagnetic coils connected to an alternating current source so that if no additional magnetic force is applied to the common magnetic core region the magnetic flux in that region will be substantially zero. A pair of magnetically responsive resistance elements, or magnetic resistors as they will be termed here, are placed within the magnetic field of each of the magnetic loops outside of the common loop region. The magnetic resistors, which have like resistance characteristics, are electrically connected in a bridge circuit with one pair of the resistors forming the first opposite arms of the bridge and the second pair forming the second opposite arms of the bridge. An alternating current source is connected to two opposite terminals of the bridge and the circuit output will appear at the other two terminals. If a signal voltage is applied electromagnetically to energize the common magnetic core region, the bridge output will vary as an amplified version of the input signal. If the common magnetic core region presents a constant magnetic bias, as when it is a permanent magnet, the output will be a full wave rectified version of the alternating current source applied to the bridge.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawing in which:

Fig. 1 is a schematic circuit diagram of a basic embodiment of the invention adapted for amplification;

Fig. 1A is a view of the electromagnetic structure 10 of Fig. 1 showing the physical location of the magnetic resistors in the air gaps thereof;

Fig. 2 is a schematic circuit diagram of a modification of the embodiment of the invention shown in Fig. 1; and Fig. 3 is a schematic circuit diagram of an embodiment of the invention adapted for rectification.

In the various figures like elements bear similar reference characters. First directing attention to Fig. 1, there is shown a magnetoresistive bridge amplifier consisting basically of an electromagnetic assembly 10 and electrical bridge circuit 11. The electromagnetic assembly is composed of a divided core structure having left, right and center core sections 12, 14 and 16 respectively. The left and right sections 12 and 14 combine to form a principal flux path loop and each of these side sections combine with the center core section 16 to form a subsidiary flux path loop. Coil 18 energizes the left subsidiary loop through core sections 12 and 16 and like coil 20 energizes the right subsidiary loop through core sections 14 and 16. The center core section 16 which is common to both subsidiary loops is electromagnetically energized by coil 22 connected to a source of input signal.

Coils 18 and 20 are energized in series and are connected so that the flux produced by coil 22 in core 16 opposes the flux in one subsidiary loop and adds to the flux in the other. Like magnetic resistors 24 and 26 are positioned within a gap in the left core section 12 and are electrically connected as opposite arms of an electrical bridge circuit 11. Similarly, magnetic resistors 28 and 30, identical to resistors 24 and 26, are positioned within a gap in the right core section 14, and are electrically connected as the other two opposite arms of the bridge 11. The bridge and electromagnetic coils 18 and 20 are connected in series to a source of alternating current. The connection to the bridge is at terminals 32 and 34. A variable capacitor 36 is included in the series circuit to balance out the inductive reactance introduced by coils 18 and 20. This capacitor may also be placed in parallel with the bridge-coil circuit to form an anti-resonant circuit in order to present a higher impedance to the source. A low pass filter 38 is connected to bridge output terminals 40 and 42 far passing frequencies lower than the source ripple frequency, which is two times the source frequency. The ripple frequency should be made high with respect to the signal frequencies in order that the filter have little effect on the signal frequencies. An electrical load 44 is shown connected to the output of low-pass filter 38.

To consider the operation of the circuit shown in Fig. 1, assume first that a source of alternating current is connected to the circuit as indicated without a signal voltage being applied to coil 22. With this condition equal flux will be introduced into the left and right core sections 12 and 14, and thus all magnetic resistors will be subjected to a like field and their resistances will remain equal. The electrical bridge 11 will be balanced and therefore the output at bridge terminals 40 and 42 will be zero.

Assume next that an input signal is impressed on coil 22. For a given polarity of signal the resulting flux will add to the flux in one subsidiary loop and subtract from the flux in the other. The addition or subtraction will depend upon the instantaneous polarity of the source potential applied to coils 18 and 20. With an unbalanced flux existing as between the left and right core sections 12 and 14, the resistance of the associated magnetic resistors change, the resistance of the resistors subjected to the increased field decreasing in value and the resistors subjected to the decreased field increasing in value. Inasmuch as the resistors changing value in the same direction form opposite arms of the bridge there will be a current output at terminals 40 and 42. It may be expressed as $$I = KE_p \cos pt E_w (\sin^2 wt + f(wt)) \qquad (1)$$

Where K is a constant which is dependent on the magnetic material and magnetic resistors employed, $E_p$ is the voltage amplitude of the signal voltage, $p$ is the angular frequency of the signal voltage, $t$ is time, $w$ is the angular frequency of the power source, $E_w$ is the voltage amplitude of the source voltage, and $f(wt)$ is an expansion of fourth and higher even powers of $\sin wt$ and $\cos wt$ and which will have a value negligible when compared with $\sin^2 wt$. In any event, after filtering, the source frequency components including those caused by differences in magnetic resistors are eliminated, and the output voltage available to load 44 may be written simply as $$E_0 = GE_p \sin pt \qquad (2)$$

where G is the gain of the amplifier and is largely determined by the value of K from Equation 1.

The magnetoresistive circuit shown in Fig. 2 is designed to eliminate the need of the low pass filter 38 shown in the circuit in Fig. 1. This has been accomplished by connecting in parallel two circuits similar to the one shown in Fig. 1 but differing in that the circuit constants are fixed so that there exists a 90° phase difference between the current applied to the respective circuits from the alternating current source. To improve operation D.C. isolation between the A.C. power inputs is provided by transformer 39 which has separate windings for each circuit. Other methods of isolation may of course be employed. The magnetic resistors of Fig. 2 occupy the same physical position with respect to their associated core elements as the similarly numbered elements shown in Fig. 1A.

In the top magnetoresistive circuit in Fig. 2, comprising electromagnetic assembly 10a and electrical bridge 11a, the capacitor 36 has been removed and the effective resistance of the bridge in series with coils 18a and 20a is made equal to the inductive reactance, at the A.C. source frequency, of these coils in series. This will cause the current to lag the applied voltage by 45°. In the lower magnetoresistive circuit the effective bridge resistance and the series coil reactance are also fixed with the same value. However, a capacitor 46 is placed in series with the coils 18b and 20b with a capacitive reactance twice that of the coil inductive reactance. As a result, the net reactance of the circuit is capacitive and equal to the bridge resistance. In this manner the current is made to lead the applied voltage by 45°. Adding the current outputs from bridge 11a and 11b, which may be written as $$I_a = KE_p \cos pt E_w \sin^2 (wt-45) =$$
$$KE_p \cos pt E_w \cos^2 (wt+45) \qquad (3)$$

and $$I_b = KE_p \cos pt E_w \sin^2 (wt+45) \qquad (4)$$

their sum is $$I_a + I_b = KE_p E_w \cos pt \qquad (5)$$

Therefore, only the signal input frequency will appear in the output.

The amplitude of the source current for maximum gain should be adjusted so that the amplitude of the magnetic induction in the coils is approximately ½ the saturation induction.

The outputs of the magnetic resistor bridges may be connected in series instead of in parallel as shown in Fig. 2, and the result will be similar to that indicated by Equation 5. It is essential that the interconnection between the input coils 22a and 22b and electrical bridges 11a and 11b be poled to produce like phase output.

Fig. 3 shows a magnetoresistive rectifier employing substantially the same circuitry as shown in Fig. 1. The core structure 48 of the electromagnetic assembly 50 has been modified to provide permanent magnetic biasing by permanent magnet 52, and core sections 54 and 56 as A.C. magnetic loop paths have been added in order that very little A.C. flux appear in the permanent magnet. As explained in the case of Fig. 2 above the physical location of the magnetic resistors with respect to the associated core element is the same as the similarly numbered components of Fig. 1A. The permanent magnet is chosen to produce near saturation in the core structure without coils 18c and 20c being energized. When they are energized by an alternating current, during one phase of the A.C. cycle the flux forces in one outer core section, say the left section 55, will subtract, and during the opposite phase they will subtract in the right core section 57. The result will be that during the first period the resistance of magnetic resistors 24c and 26c will be much larger than the resistance of resistors 28c and 30c and during the opposite phase of the A.C. cycle the effect will be reversed and the resistance of magnetic resistors 28c and 30c will be increased with respect to resistors 24c and 26c. It will be readily observed that with this alternating increase in resistance between sets of opposite bridge resistors, which is synchronized with the alternating current source, the low resistance path through the bridge 11c will always be such that current will flow in one direction through the load circuit 44b. Rectification is thus obtained.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A magnetoresistive bridge circuit comprising first and second pairs of magnetically responsive resistors, means for applying alternating current induced alternately reversing magnetization fields of opposite sense to said first and second pairs of resistors respectively, means for applying magnetization fields of like sense to said first and second pairs of resistors, and said first pair of resistors being connected as two opposite arms of an electrical bridge and said second pair of resistors being connected as the other two opposite arms of said electrical bridge, an alternating current source of the same frequency as said first named means being connected across a first pair of opposite terminals of said bridge and a pair of output terminals being connected across the other pair of bridge terminals.

2. A magnetoresistive bridge circuit comprising a magnetic core having first and second flux paths and a third flux path common to said first and second flux paths, a first electrical winding associated with said first flux path and a second electrical winding associated with said second flux path, said windings being connected to a source of alternating current to produce equal and opposite magnetic flux forces in said third flux path, a pair of magnetically responsive resistors positioned within a flux gap in each of said first and second flux paths, said gaps being located in the non-common regions of said first and second flux paths, an electrical bridge, two opposite arms of said bridge comprising one of said pairs of said magnetically responsive resistors and the other two opposite arms comprising the remaining pair of said magnetically responsive resistors, said source of alternating current potential being connected to two opposite terminals of said bridge, and the remaining terminals of said bridge being the output terminals of said circuit.

3. A circuit as set forth in claim 2, wherein said third flux path comprises a magnetic core and an electromagnetic coil associated with said magnetic core.

4. A circuit as set forth in claim 2, wherein said third flux path comprises a permanent magnet.

5. A circuit as set forth in claim 2, wherein said first and second windings are connected to said source of alternating current in series with a capacitor and said opposite terminals of said bridge, and a low-pass filter for passing frequencies lower than two times the frequency of said source of alternating current being connected with its input to said output terminals.

6. A circuit as set forth in claim 3, wherein said first and second windings are connected to said source of alternating current in series with said opposite terminals of said bridge, the effective resistance between said opposite terminals being equal to the inductive reactance of said windings, and further comprising a second said circuit, a capacitor in series with said first and second windings of said second circuit, the capacitative reactance of said capacitor being equal to said inductive reactance, said electromagnetic coils of said first and second circuits being electrically connected, said output terminals of said first and said second circuits being electrically connected, the interconnection of said electromagnets and said output terminals being poled to produce like phase output across said interconnected output terminals.

7. A circuit as set forth in claim 4, wherein said magnetic core comprises two outer core sections for said first and second flux paths respectively and said circuit further comprising two intermediately spaced core sections.

References Cited in the file of this patent

UNITED STATES PATENTS

| | | |
|---|---|---|
| 1,810,539 | Sokoloff | June 16, 1931 |
| 2,172,961 | Merz | Sept. 12, 1939 |
| 2,620,466 | Hagen | Dec. 2, 1952 |
| 2,752,553 | Dunlap | June 26, 1957 |
| 2,846,642 | Few et al. | Aug. 5, 1958 |